US012759456B2

(12) United States Patent
Kostuch

(10) Patent No.: US 12,759,456 B2
(45) Date of Patent: Oct. 13, 2026

(54) VEHICLE EXIT ASSISTANCE

(71) Applicant: Aptiv Technologies (2) S.à r.l., Luxembourg (LU)

(72) Inventor: Aleksander Kostuch, Cracow (PL)

(73) Assignee: Aptiv Technologies AG, Schaffhausen (CH)

(*) Notice: Subject to any disclaimer, the term of this patent is extended or adjusted under 35 U.S.C. 154(b) by 301 days.

(21) Appl. No.: 18/481,219

(22) Filed: Oct. 4, 2023

(65) Prior Publication Data

US 2024/0116439 A1 Apr. 11, 2024

(30) Foreign Application Priority Data

Oct. 5, 2022 (EP) .................................... 22199861

(51) Int. Cl.
*B60Q 9/00* (2006.01)
*E05B 77/02* (2014.01)
(Continued)

(52) U.S. Cl.
CPC .............. *B60Q 9/008* (2013.01); *E05B 77/02* (2013.01); *E05B 81/56* (2013.01); *G06T 7/73* (2017.01);
(Continued)

(58) Field of Classification Search
CPC ............ B60Q 9/008; B60R 2021/0006; B60R 2021/01013; G06V 20/58; G06V 20/59; G06T 2207/30268
See application file for complete search history.

(56) References Cited

U.S. PATENT DOCUMENTS 7,586,402 B2 * 9/2009 Bihler ..................... E05B 77/12
49/31
10,026,319 B2 * 7/2018 Wu ....................... G06V 20/56
(Continued)

FOREIGN PATENT DOCUMENTS

CN 106143299 A 11/2016
CN 109863048 A 6/2019
(Continued)

OTHER PUBLICATIONS

M. Zhu et al., "A Novel Vehicle Open Door Safety System Based on Cyclist Detection Using Fisheye Camera and Improved Deep Convolutional Generative Adversarial Nets," 2019 IEEE Intelligent Vehicles Symposium (IV), Paris, France, 2019, pp. 2195-2201, doi: 10.1109/IVS.2019.8814269.) (Year: 2019).*
(Continued)

*Primary Examiner* — Chan S Park
*Assistant Examiner* — Chandhana Pedapati
(74) *Attorney, Agent, or Firm* — Miller Johnson

(57) ABSTRACT

A computer-implemented method for vehicle exit assistance includes analyzing interior cabin data originating from a vehicle sensing system to detect a position and/or movement of a person in a cabin of a vehicle. The computer-implemented method includes determining, based on the detected position and/or movement of the person, a door opening act indicative of an intention of the person to exit the vehicle. The computer-implemented method includes determining, based on exterior environment data collected from the vehicle sensing system, an object in a vicinity of the vehicle. The computer-implemented method includes determining a vehicle exit score based on the object and the door opening act. The computer-implemented method includes outputting, based on the vehicle exit score, a control signal to a vehicle
(Continued)

assistance system of the vehicle to control vehicle exit of the person.

18 Claims, 17 Drawing Sheets

(51) Int. Cl.

| | |
|---|---|
| ***E05B 81/56*** | (2014.01) |
| ***G06T 7/73*** | (2017.01) |
| ***G06V 20/58*** | (2022.01) |
| ***G06V 20/59*** | (2022.01) |

(52) U.S. Cl.
CPC .............. *G06V 20/58* (2022.01); *G06V 20/59* (2022.01); *G06T 2207/30201* (2013.01); *G06T 2207/30268* (2013.01)

(56) References Cited

U.S. PATENT DOCUMENTS

| | | | | |
|---|---|---|---|---|
| 10,586,448 | B2 * | 3/2020 | Sholingar | B60W 50/14 |
| 2015/0175072 | A1 * | 6/2015 | Sabeti | G06V 20/58 348/148 |
| 2019/0211587 | A1 * | 7/2019 | Ganeshan | B60Q 5/006 |
| 2020/0386032 | A1 * | 12/2020 | Battlogg | B60Q 9/00 |
| 2022/0194386 | A1 * | 6/2022 | Sato | G06V 40/28 |
| 2023/0072020 | A1 * | 3/2023 | Cornman | B60W 60/0015 |

FOREIGN PATENT DOCUMENTS

| | | | | |
|---|---|---|---|---|
| CN | 111284404 A | | 6/2020 | |
| DE | 102013013226 A1 | * | 2/2015 | G08B 21/02 |
| EP | 3594035 B1 | | 1/2020 | |
| WO | WO-2017083936 A1 | * | 5/2017 | B60Q 9/00 |
| WO | 2020216272 A1 | | 10/2020 | |
| WO | 2021133789 A1 | | 7/2021 | |

OTHER PUBLICATIONS

Extended European Search Report for EP22199861.0 dated Mar. 16, 2023, 7 pages.

Communication received for EP22199861.0 dated Mar. 12, 2026, 6 pages.

China Intellectual Property Office, First Office Action for CN202311295629.9, dated May 27, 2026, with English translation.

* cited by examiner

VEHICLE EXIT ASSISTANCE

CROSS-REFERENCE TO RELATED APPLICATIONS

This application claims priority to EP App. No. 22 199 861 filed Oct. 5, 2022, the entire disclosure of which is incorporated by reference.

FIELD

The present disclosure relates to camera-based mechanisms contributing to safety and automated control in a vehicle and more particularly to systems for vehicle exit assistance.

BACKGROUND

Vehicle exit situations may involve danger that approaching other vehicles such as motorcycles or bicycles may collide with the door, such collisions potentially causing damage to persons and the vehicles.

Such, generally, safety and assistance systems are sought which help to reduce such risks.

EP 3 594 035 (B1) describes a method and vehicle including at least one door, moveable between an open and closed position and including at least one inside door handle for opening the door, and a door opening warning system including at least one object sensor configured to detect an object outside the vehicle in a risk zone in which there is a risk that the object collides with the door if it is moved from the closed position to the open position, a touchless sensor configured to detect if a part of a user is positioned in an opening zone at the inside door handle and a touch sensor, such as an capacitive sensor, configured to detect if the user touches the inside door handle, and a control unit connected to the at least one object sensor, the touchless sensor and the touch sensor, wherein the control unit of the door opening warning system is configured to: trigger a first alarm if the object sensor detects an object in the risk zone and the touchless sensor detects a part of the user in the opening zone at the inside door handle, and trigger a second alarm if the object sensor detects an object in the risk zone and the touch sensor detects that the user is touching the inside door handle.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present disclosure seeks to provide improvements to such existing recognition mechanisms. The present methodologies are generally directed to improve systems for vehicle exit assistance. The main aspects are set out by the independent claims.

In this respect, according to a first aspect a computer-implemented method for vehicle exit assistance is provided. The method includes analyzing interior cabin data originating from a vehicle sensing system to detect a position and/or movement of a person in a cabin of the vehicle. The method further includes determining, based on the detected position and/or movement of the person, a door opening act indicative of an intention of the person to exit the vehicle, determining, based on exterior environment data collected from the vehicle sensing system, an object in a given vicinity of the vehicle, determining a vehicle exit score based on the object and the door opening act, and, based on the determined vehicle exit score, outputting a control signal to a vehicle assistance system to control vehicle exit of the person.

In another aspect, a system for vehicle exit assistance is provided, including a vehicle sensing system, a data processing system, interfaces for outputting a control signal, configured to perform the computer-implemented methods as described herein.

In another aspect, a vehicle is provided including a system for vehicle exit assistance as described herein.

Finally, a computer program is presented that includes instructions which, when the program is executed by a computer, cause the computer to carry out the methods described herein.

Further refinements are set forth by the dependent claims.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

Aspects and examples of the present disclosure are described with reference to the following figures, in which.

In the drawings, reference numbers may be reused to identify similar and/or identical elements.

DETAILED DESCRIPTION

The present disclosure relates to an improvement of systems for vehicle exit assistance, especially to prevent door accidents, also commonly referred to as dooring, when a person departs a vehicle.

Figure 1:
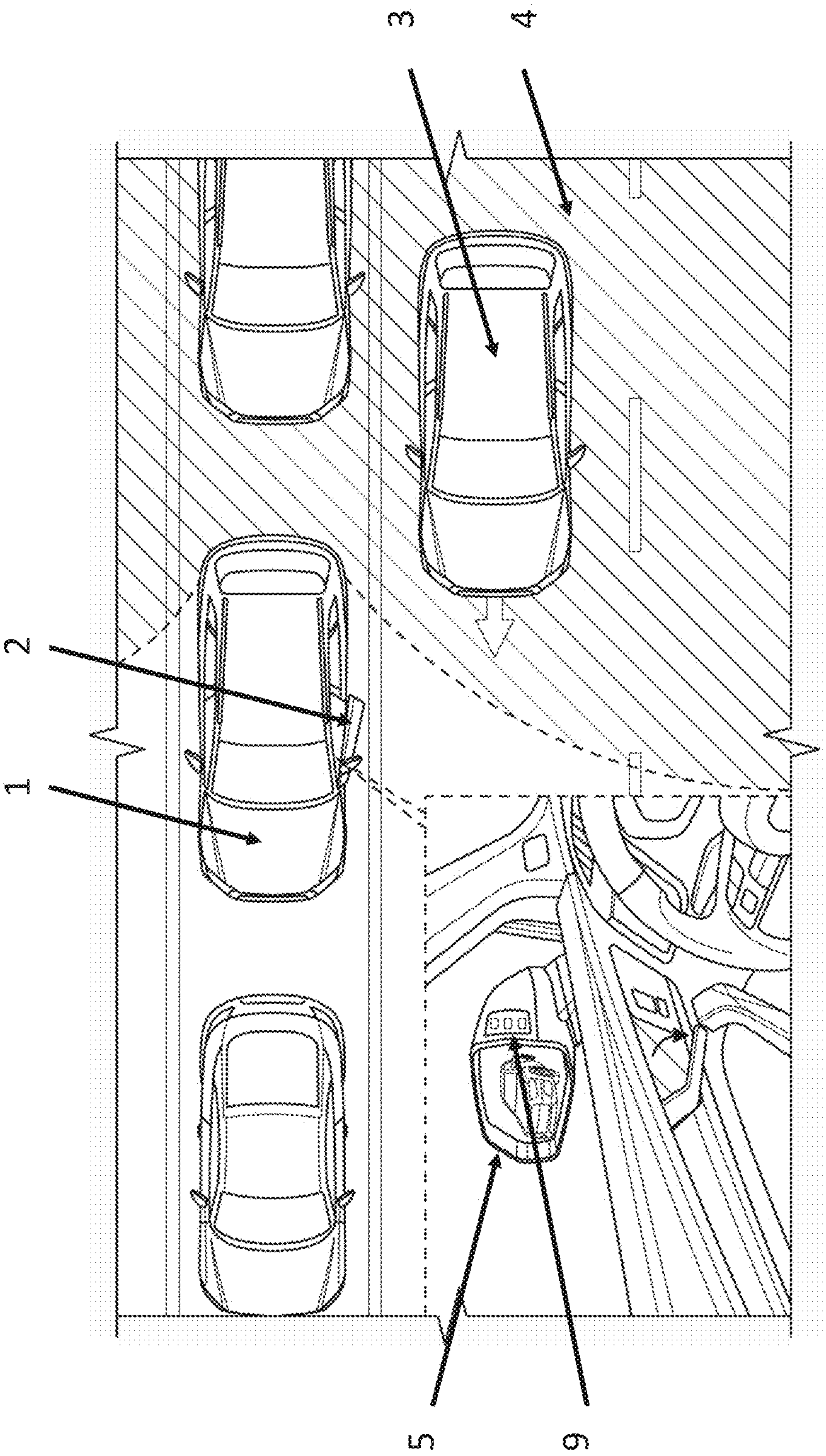
FIG. 1 shows a situation in which a door accident happens.

As an example, FIG. 1 shows a situation in which a door accident potentially occurs. A first vehicle 1 parks in a parking lane and the door 2 of the vehicle 1 is about to be opened, e. g. by a person who intends to exit the vehicle 1. At that same moment, another vehicle 3 is driving on the drive lane 4 and approaching the first vehicle 1 from behind. The door 2, when fully opened, will reach into the driving lane 4, thereby providing an obstacle to the other vehicle 3 as it proceeds along the driving lane 4. If the door 2 is not closed and, thus, removed in time from the driving lane 4, the other vehicle 3 may collide with the door 2 of first vehicle 1, causing a traffic accident with damages inflicted on the vehicles 1 and 3. The consequences of the accident can even be more severe if persons are injured. Grave injures on persons can particularly occur is vehicle 3 is a motorcycle or a bicycle.

One standard behavior to mitigate such risk of a door accident is for the person in first vehicle 1 to look out of the windows of the first vehicle 1 and check if any vehicles or pedestrians approach vehicle 1. This can be facilitated by using mirrors, such as a side mirror 5 or a rear mirror. However, this relies on the discipline of the person to actually perform these actions with all due care every time he/she intends to open the door 2 of the vehicle 1. Human nature, however, is prone to negligence, especially when for a certain amount of time no accident has happened, or the persons are in a hurry or occupied with other thoughts than traffic safety when intending to open the vehicle door to depart the vehicle 1.

Figure 2:
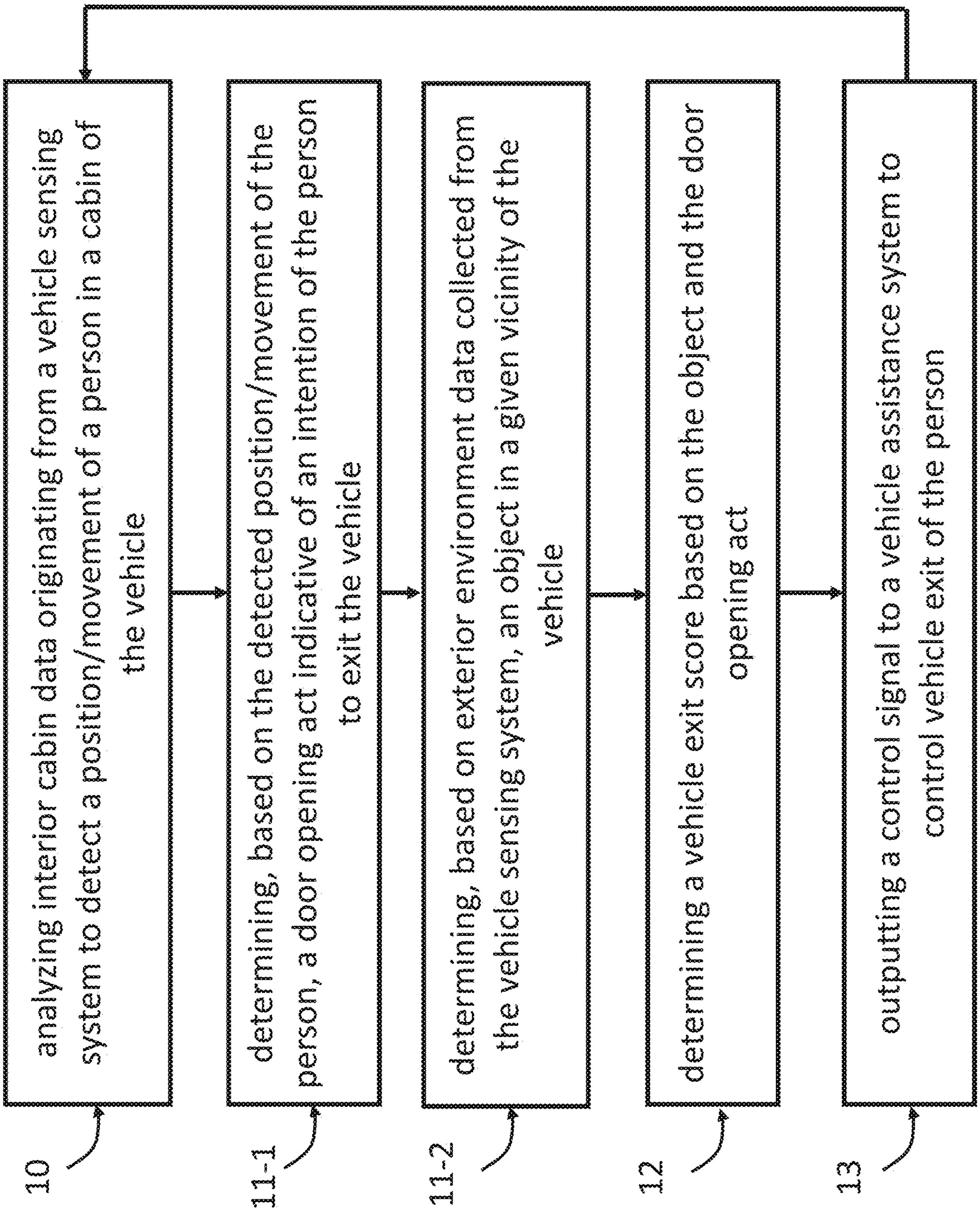
FIG. 2 shows a computer-implemented sequence for vehicle exit assistance as disclosed herein.

FIG. 2 schematically shows a computer-implemented sequence for a method for vehicle exit assistance. The sequence is executed periodically, with time periods such as 1 s or 5 s. Other time periods are also included by the present disclosure. The sequence starts immediately after the electric power supply system of the vehicle 1 has started operating. The method may be executed by an on-board vehicle assistance and/or control module. Alternatively, the method may be partially or entirely executed remotely, e.g. by a cloud-based system or a vehicle assistance and control server. The method includes analyzing 10 interior cabin data originating from a vehicle sensing system to detect a position and/or movement of a person in a cabin of the vehicle. The interior cabin data may include 2D and/or 3D data. The detection of the position and/or movements of the passenger is executed continuously. The method further includes determining 11-1, based on the detected position and/or movement of the person, a door opening act indicative of an intention of the person to exit the vehicle and determining 11-2, based on exterior environment data collected from the vehicle sensing system, an object in a given vicinity of the vehicle as well as determining 12 a vehicle exit score based on the object and the door opening act. In addition, the method includes outputting 13 a control signal to a vehicle assistance system to control vehicle exit of the person. After executing activity 13, the sequence returns to activity 10.

In this way, the danger is reduced that the vehicle door 2 is opened in moments when a hazardous situation may occur, in a way by providing an assistance for checking the situation around the vehicle when the person intents to exit the vehicle. It does not depend on the person alone anymore to carefully check the vicinity of the vehicle and the traffic situation around the vehicle before opening the door. The vehicle, as an additional instance, also performs this task of checking its vicinity and the traffic situation. If the person does not check the situations around the vehicle carefully, such as due to being in a hurry, due to negligence or just by forgetting it, there is still the vehicle sensing system as the second instance to perform these checks.

The vehicle exit score may indicate a risk level of the vehicle exit. For example, a higher vehicle exit score may indicate a higher risk level of the vehicle exit and a lower vehicle exit score may indicate a lower risk level of the vehicle exit. In some embodiments, the vehicle exit score may be a number, e.g. a normalized number within a given range, e.g. between 0 and 100, with 0 indicating no risk of the vehicle exit (e.g. because no relevant object outside of the vehicle at all has been detected) and 100 indicating maximum risk. In some embodiments, the vehicle exit score may be a more complex figure, e.g. a feature vector, a vector indicating multiple characteristics incorporated by the vehicle exit score (e.g. characteristics of the determined object as explained in more detail below), a vector indicating multiple weighted characteristics incorporated by the vehicle exit score, an aggregated number plus the more detailed vector, and so on.

In addition, the method as described in the present disclosure idea ensures sufficient response times. The response times are short enough, so that it is possible to give e. g. a warning signal to the person intending to open a door of the vehicle 1 and/or locking the corresponding door before an object approaching the vehicle 1 reaches the door and collides with that door. At the same time, the present methodologies render the entire system user-friendly as the is not overly intrusive and output warning signals or takes safety measures if the risk of the vehicle exit is determined to be significant enough.

In some embodiments, the vehicle sensing system includes a vehicle interior sensing system and a vehicle exterior sensing system and wherein the interior cabin data originates from the vehicle-interior sensing system and the exterior environment data originates from the vehicle-exterior sensing system. The sensors of the vehicle sensing system begin to operate continuously immediately after the electric power supply system of the vehicle 1 starts to operate. The sensors detecting a position and/or movement of a person in a cabin of the vehicle may include 2D and/or 3D sensors. The sensors for the exterior environment of the vehicle 1 may sense a range up to at least 30 meters or even up to 100 meters.

Figure 3:
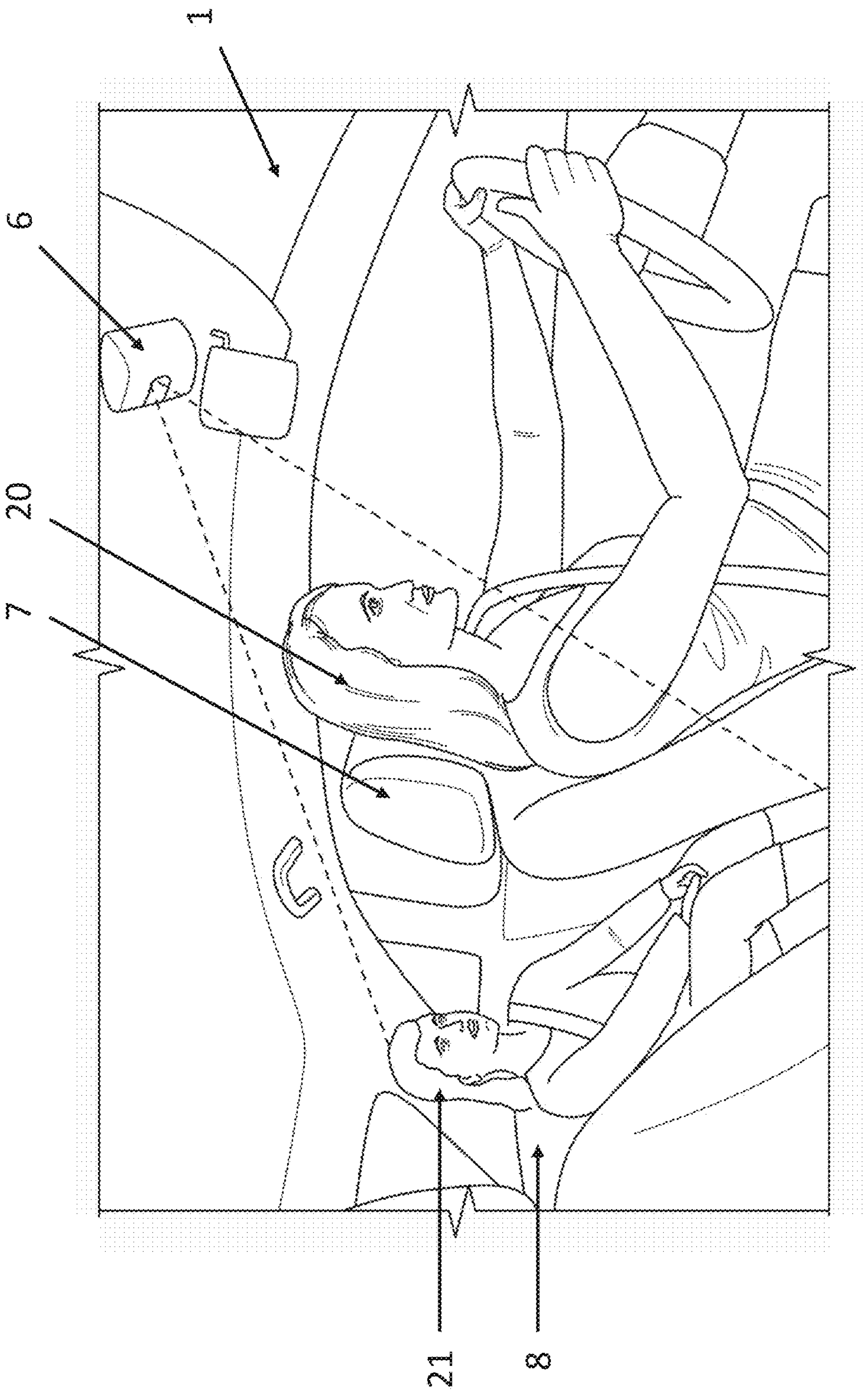
FIG. 3 shows a vehicle interior sensing system.

As an example, FIG. 3 shows a vehicle interior sensing system 6, being part of the vehicle sensing system and located in the cabin of vehicle 1. The vehicle interior sensing system senses the presence. the positions and the movements of the persons in the cabin, in the example of FIG. 3 a driving person 20 sitting on the driver seat 7 and a person 21 sitting on the backseat 8.

In some embodiments, the vehicle interior sensing system 6 and/or the vehicle exterior sensing system includes one or more camera systems. In some embodiments, the one or more camera systems include one or more infrared cameras or one or more cameras operating in the visible light spectrum. In some embodiments, the vehicle interior sensing system 6 includes sensors, such as cameras located at different points in the cabin of vehicle 1. In some embodiments, the vehicle exterior sensing system includes sensors, such as cameras, at different exterior positions of the vehicle 1. In some embodiments, the vehicle exterior sensing system include a radar system. In some embodiments, the vehicle interior system 6 includes a radar system, such as a 60 GHz MIMO radar system for the detection of the presence of persons inside the cabin of the vehicle 1 and the movements of the persons.

Figure 4:
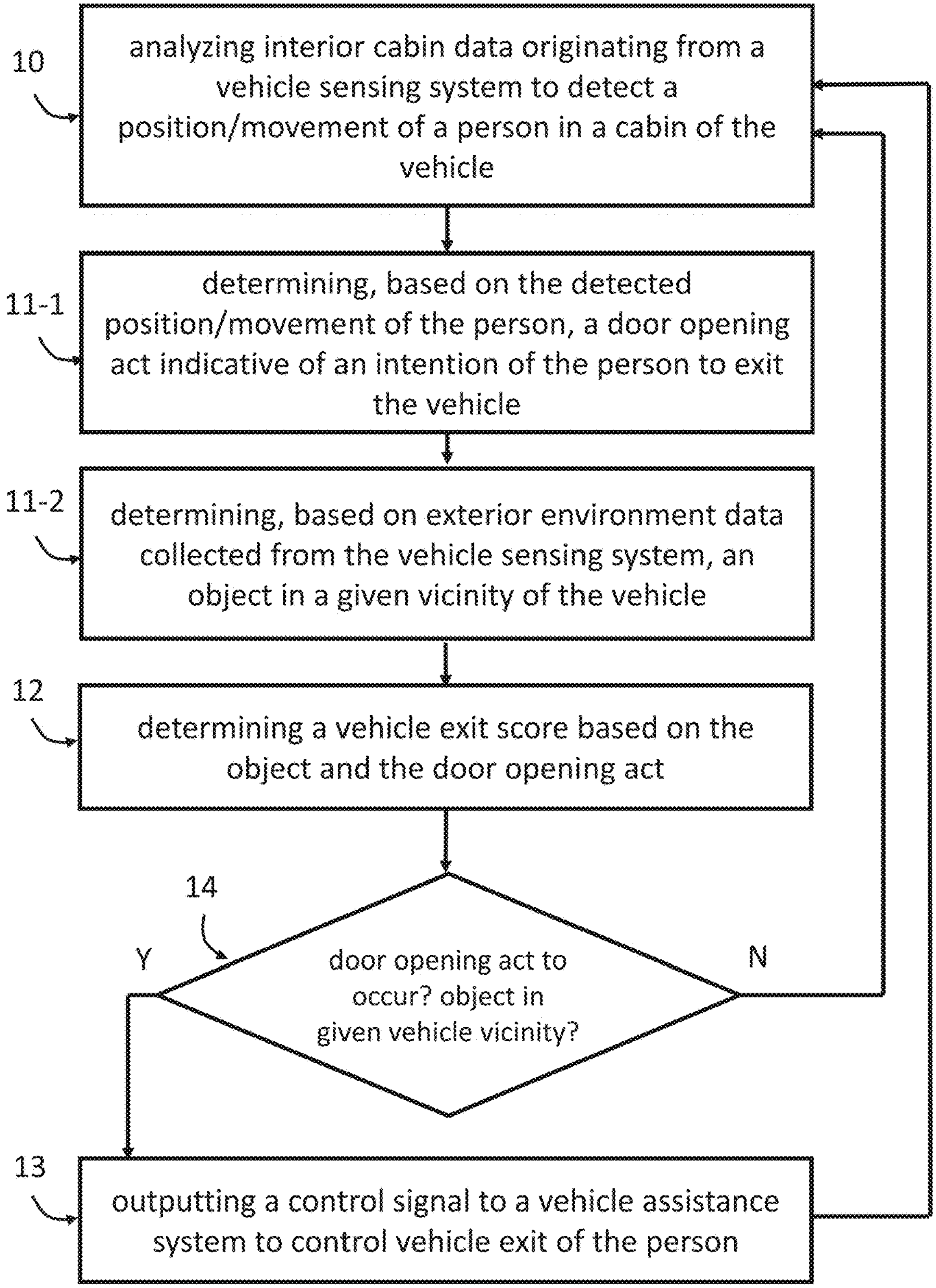
FIG. 4 shows a second computer-implemented sequence for vehicle exit assistance as disclosed herein.

In some embodiments, a control signal is outputted in response to determining that the door opening act is about to occur and that an object in the given vicinity of the vehicle is detected. FIG. 4 shows a corresponding example sequence. The sequence shown in FIG. 4 resembles that of FIG. 2, however, in additional activity 14, it is determined, after performing activities 10, 11-1, 11-2 and 12 of FIG. 2, that a door opening act by a person in the cabin of the vehicle 1 is actually about to occur and that indeed a vehicle/object/person is in a given vicinity of the vehicle 1, e. g. a vehicle 3 approaching the close vicinity of the door 2 just to be opened by the person in the vehicle 1. If both conditions are met cumulatively, the control signal to the vehicle assistance system is outputted. If, in some embodiments, the determinations yield that either a door opening act is not about to occur or there is no vehicle in a given vicinity of vehicle 1, then no control signal is outputted to the vehicle assistance system and the sequence returns to activity 10, where the sequence enters its next cycle. This ensures that the control signal is outputted in situations when the vehicle door 2 is intended to be opened in moments when a potential danger of e. g. a dooring accident may be present.

Figure 5:
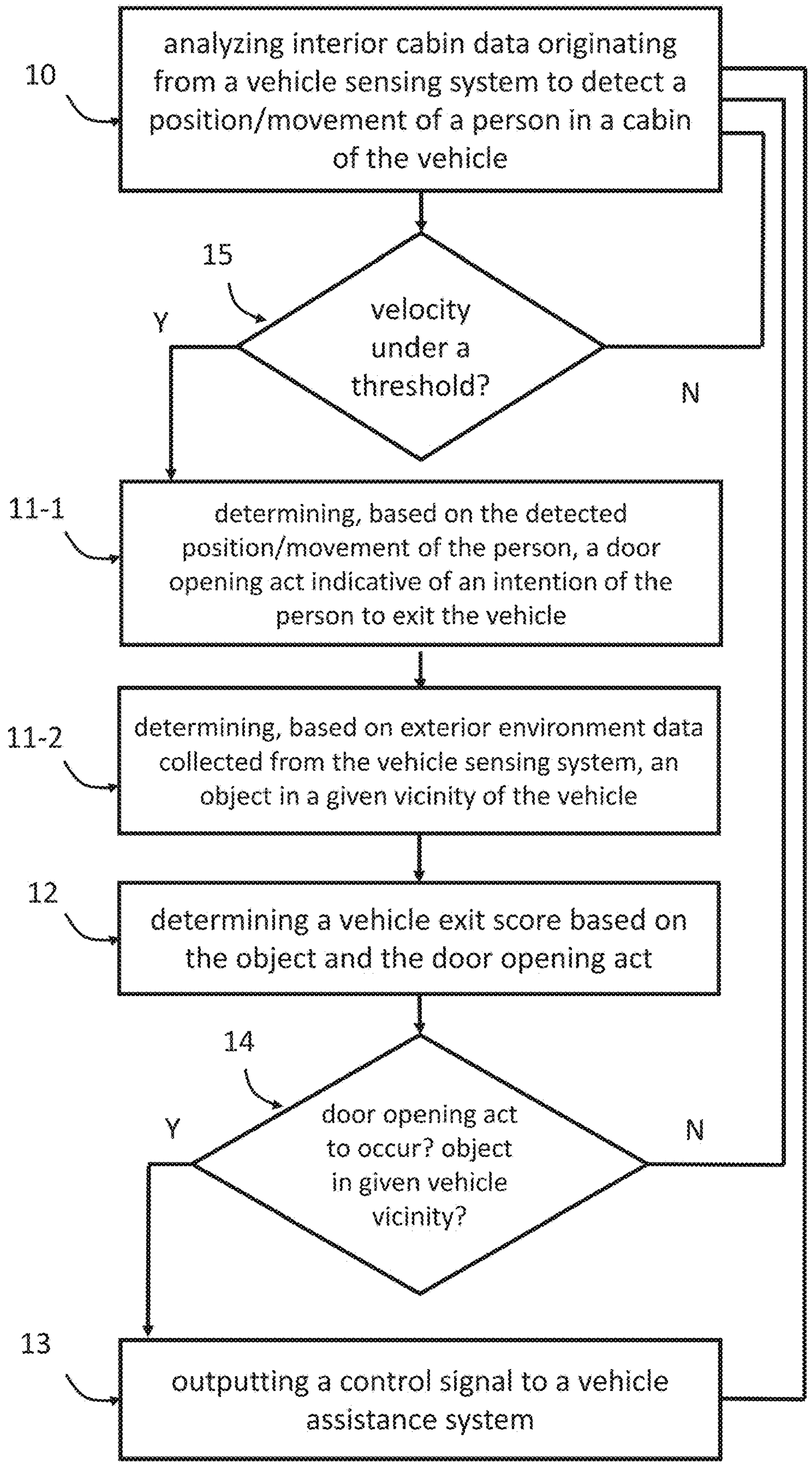
FIG. 5 shows a third example of a computer-implemented sequence for vehicle exit assistance as disclosed herein.

The determination whether of a door opening act may include analyzing the current velocity of the vehicle 1. In the case the vehicle is proceeding at a usual driving speed, e. g. 50 km/h, it is unlikely that a person in the vehicle 1 intents to leave the vehicle and therefore to open a vehicle door. In some embodiments, including outputting the control signal in response to that data on the current velocity of the vehicle indicates that the current velocity of the vehicle is under a given threshold. As an example, FIG. 5 shows a corresponding sequence diagram. The sequence of FIG. 5 resembles that of FIG. 4. However, in activity 15, it is determined whether the velocity of the vehicle 1 is under—or corresponding to—a given threshold, e. g. the usual walking speed of a pedestrian of around 5 km/h. If this determination returns the result that the velocity of the vehicle 1 is indeed under a given threshold, then, activities 11-1, 11-2 and 12 are executed and in activity 14, it is determined that a door opening act is actually about to occur and that an object is actually in a given vicinity of the vehicle 1. If both conditions are met cumulatively, a control signal is outputted to the vehicle assistance system. This further enhances the reliability of the vehicle assistance system.

In some embodiments, the determination of a door opening act includes the determination of a number of body keypoints indicative of the location of defined body portions of the person.

Figure 6:
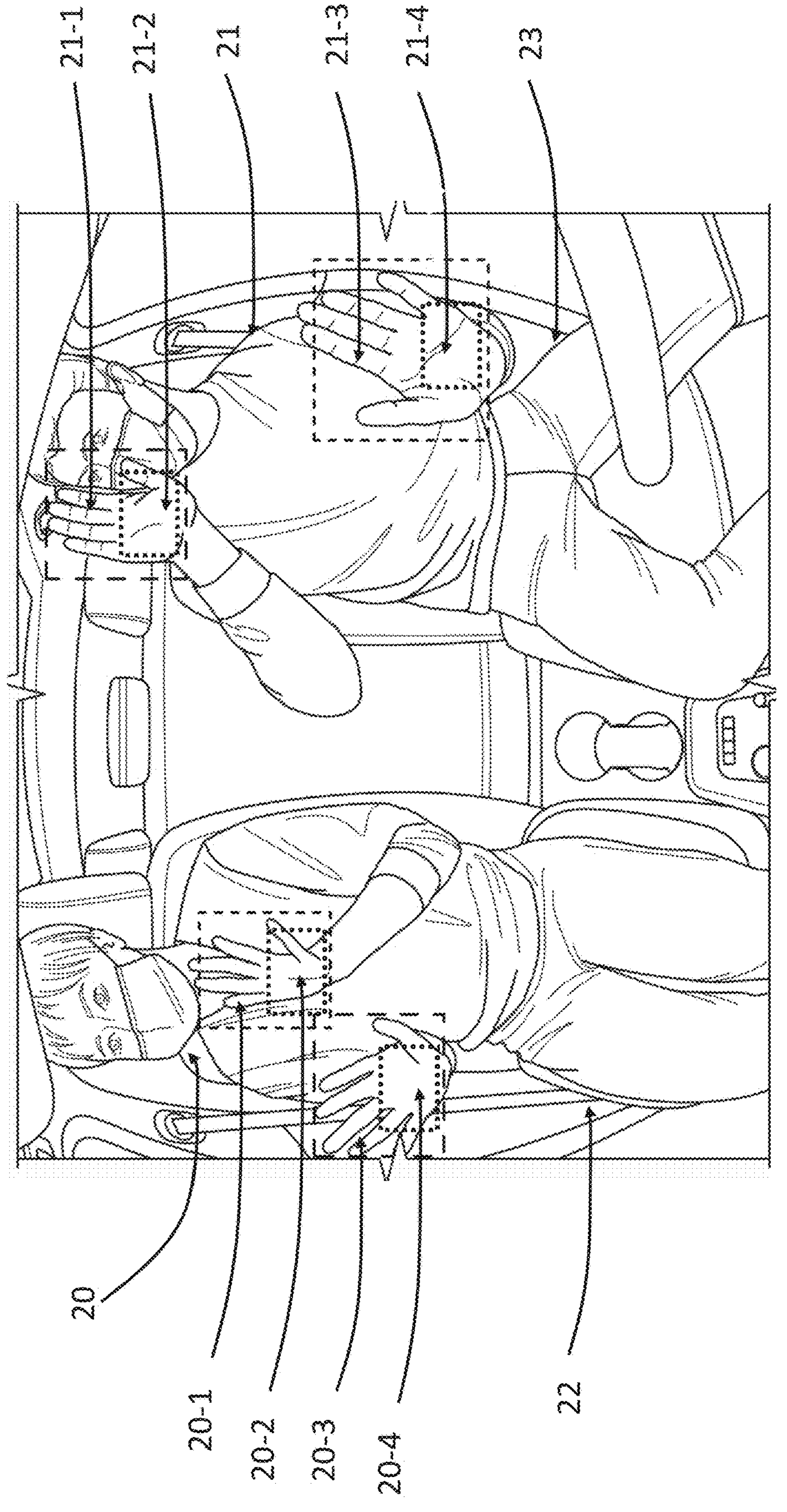
FIG. 6 shows a number of body keypoints of two persons sitting in the cabin of a vehicle.

As an example, FIG. 6 shows a number of body keypoints of two persons 20, 21 sitting on the front seats 22, 23 of vehicle 1. The picture shown in FIG. 6 (as those shown in FIGS. 7 and 8) may be taken by an on-board camera of the vehicle sensing system such as the interior vehicle sensing system 6. In this example, body keypoints are indicated by a bounding area or bounding box surrounding the respective body keypoint. The bounding areas or bounding boxes may be defined by a processing software applied on the data generated by the vehicle sensing system 6. The bodies of the persons may be clearly visible (as shown) by the vehicle-interior camera system of vehicle 1 or may also be obstructed to some part. In FIG. 6, the following body keypoints of the persons are defined:

Person 20: Left hand full 20-1; left palm 20-2; right hand full 20-3; right palm 20-4;

Person 21: Left hand full 21-1; left palm 21-2; right hand full 21-3; right palm 21-4.

Hence, FIG. 6 depicts body keypoints definition for hand tracking. This can be used to determine whether a person intends to open the door, e.g., if the person's hand moves towards the door opener. In some embodiments, further or other body keypoints may be defined, including body portions such as shoulders, elbows, heads and faces. Face-related body keypoints may include eyes, noses, ears and lips etc. As shown in FIG. 6, the areas surrounding a body keypoint include a rectangular surface. The bounding areas may be defined by at least a width, a height, a center x position, and a center y position relative to an image taken by e. g. a camera of the vehicle sensing system. However, depending on the occupancy situation of the vehicle cabin and the constructive boundary conditions of the cabin itself, other shapes used for the bounding areas may be more suited for a successful tracking of body keypoints than a rectangular surface. In some embodiments, the bounding areas surrounding a body keypoint include a circular surface, which usually defined a closer area around a body keypoint than a rectangular surface. In some further embodiments, the areas include a bounding area of any spatial dimension, such as a three-dimensional bounding area, which is useful in the case the vehicle sensing system supports three-dimensional imaging on the vehicle cabin and the persons inside the cabin. In further embodiments, any shape for the bounding areas suited for indicating body keypoints under a given sensing technology may be used or, alternatively, no surrounding area is defined but only the body keypoints are determined. For determining bounding areas, e.g., bounding boxes around the body keypoints of a person, a YOLO (you only look once) algorithm, e.g., YOLO 2, may be used. Other machine learning algorithms or conventional image processing and recognition algorithms may be used, too.

In some embodiments, the determination of a door opening act includes the determination whether the person has unfastened his/her seatbelt, and/or based on the interior cabin data, whether the head and/or the eyes of the person gaze towards the door.

Figure 7:
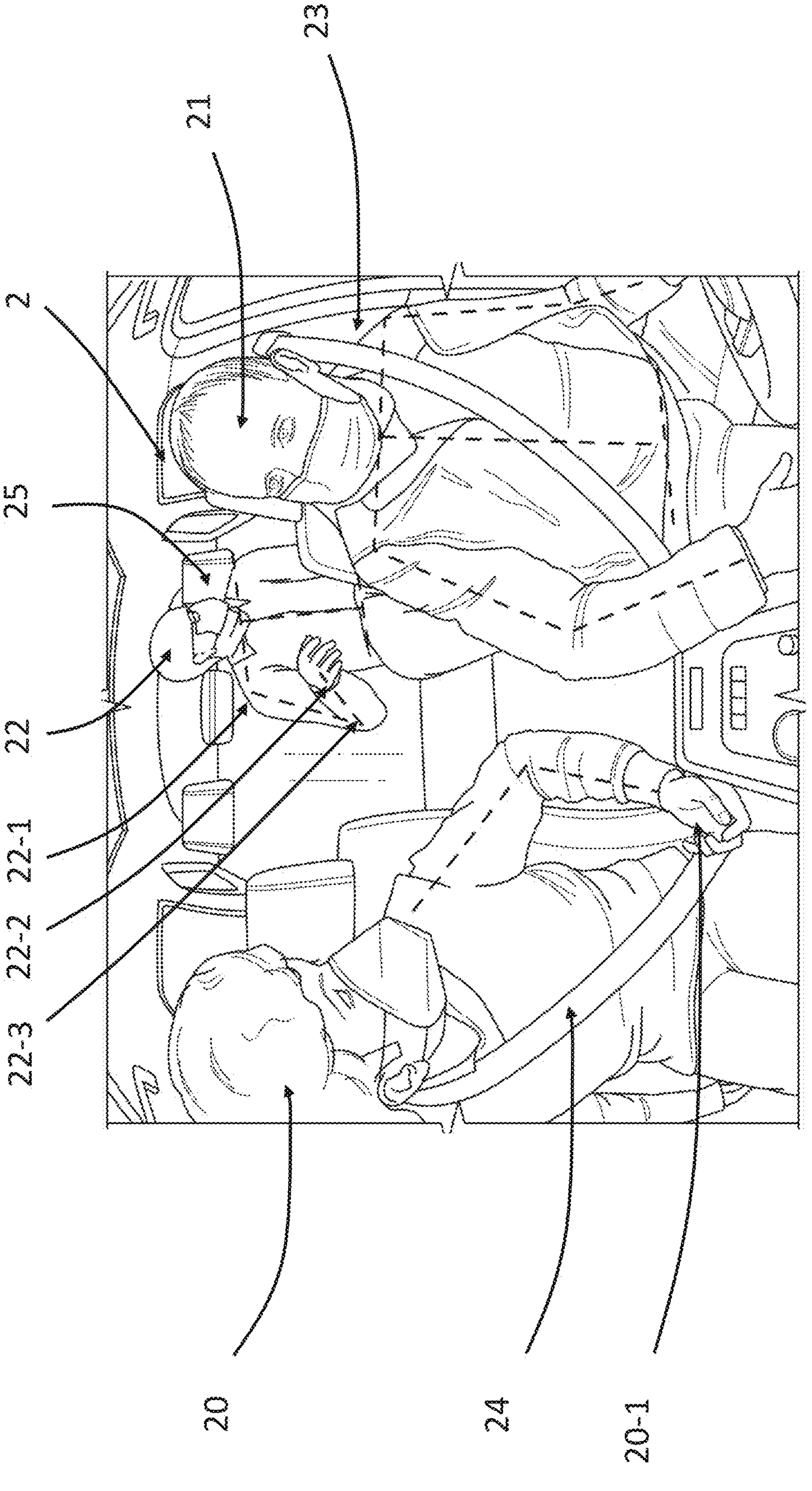
FIG. 7 shows a number of body keypoints of three persons sitting in the cabin of a vehicle.

As an example, FIG. 7 shows the unfastening of seatbelt 24 by person 20 of vehicle 1. Person 20 uses his/her right hand 20-1 to pull the seatbelt-fastener to unfasten seatbelt 24. Person 21 seated on the driver seat 23 of vehicle 1 does not intent to open his/her seatbelt.

In some embodiments, determining of a door opening act may take into account the geometry and functionality of the seat belt and the way the seat belt is fastened and unfastened, especially the type of fasteners which fasten the seat belt and the types of operations a person has to perform e. g. with his hand and fingers to operate a specific type of fastener. The vehicle sensing system therefore also detects the types of the seat belts, especially their types of fasteners and the movement of the hands and the fingers of the person when operating the seat belt and its fastener. In some embodiments, the vehicle sensing system detects seatbelt-fastener for the front seats of vehicle 1 and/or seatbelt-fastener for the back seats of vehicle 1. In some embodiments, the vehicle sensing system detects seatbelt fastener for child seats.

Figure 8:
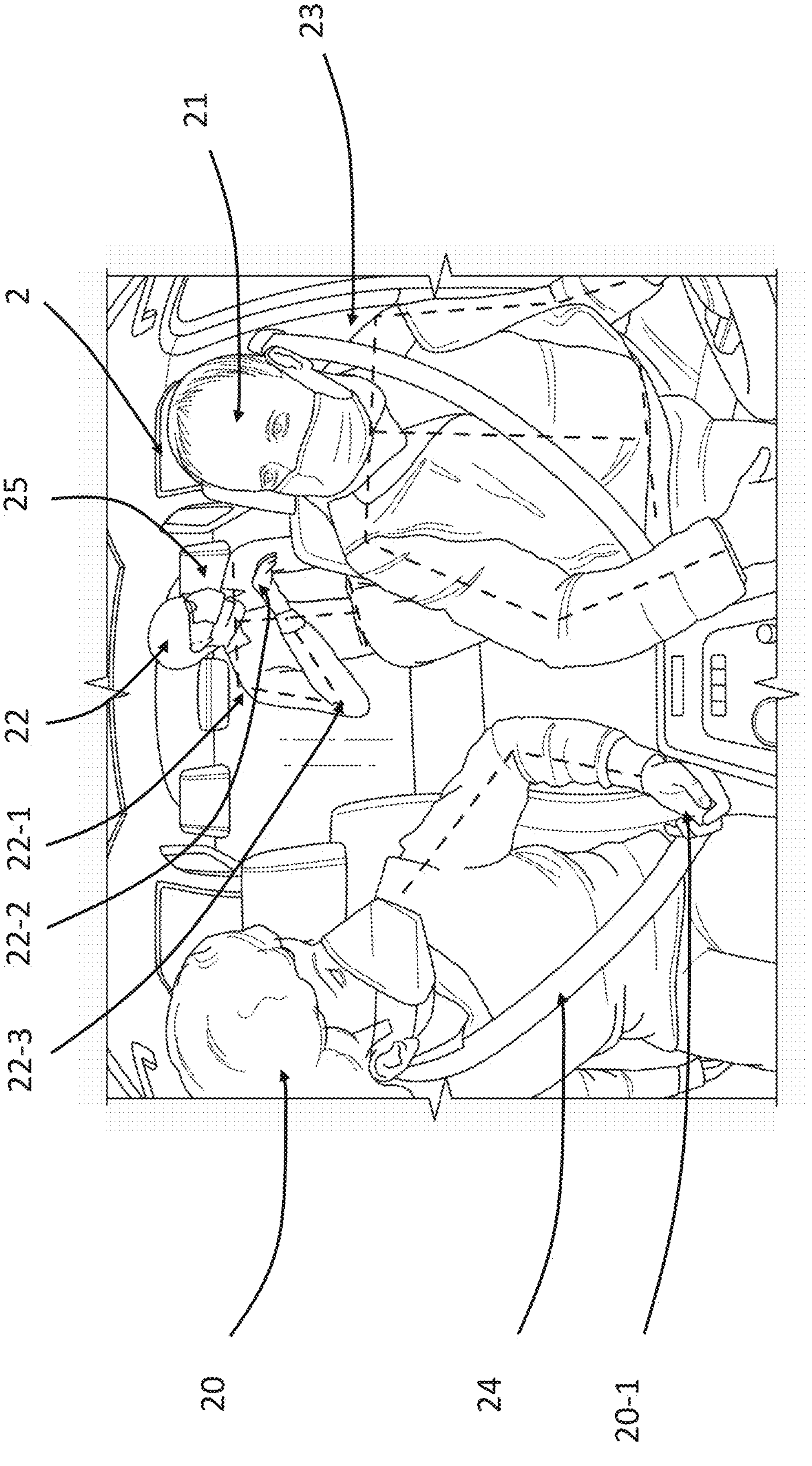
FIG. 8 shows a number of body keypoints of three persons sitting in the cabin of a vehicle in a different posture compared to FIG. 7.

As an example, FIG. 8 shows a person 22 sitting on a back seat 25 gazing towards the door 2 of vehicle 1, indicating his/her possible intention to open door 2 in order to depart vehicle 1. Furthermore, person 22 has not fastened his/her seatbelt.

In some embodiments, when the head and/or the eyes of the person gazes towards the door of the vehicle, the tracking of the movement of the person is continued until a determined probability of a door opening act to occur exceeds a given probability threshold. This reduces the probability to erroneously detect an intention of a door opening and, accordingly, that e. g. a false alarm is triggered.

In some embodiments the determination of a door opening act includes tracking of one or more shoulder keypoints and/or hand keypoints and/or elbow keypoints.

The tracking of body keypoints and/or the determination whether the person has unfastened his/her seatbelt enables the system to more reliably determine whether a door opening act to about to occur.

As example, FIGS. 7 and 8 show the tracking of shoulders 22-1, hands 22-2 and elbows 22-3 of person 22. Tracking from FIG. 7 to FIG. 8, it is be observed that person 22 uses his/her shoulder 22-1 and elbow 22-3 to move his/her hand 22-3 toward the door 2 of vehicle 1.

In some embodiments, the determination of a door opening act includes tracking of any body keypoints of any body portion of the persons of vehicle 1.

In some embodiments, the determination of the probability of a door opening act includes detecting areas surrounding a hand of the person and a handle of the door 2 of vehicle 1 and calculating the distance and/or the overlap between the hand and the handle. In further embodiments, any shape for the detecting areas are included. In some further embodiments, the areas include a volume of any spatial dimension. In some embodiments, the distance includes any line connection a point within the detecting area surrounding the hand and a point within the detecting area surrounding the handle. In some embodiments the overlay includes any area or volume with are part of the detecting area surrounding the hand and the detecting area surrounding the handle. This further enables the system to more reliably determine a door opening act.

In some embodiments, the determination 12 of the vehicle exit score is based on the characteristics of the vehicle 1 and/or the characteristics of the object in the vicinity of the vehicle 1. The characteristics of the vehicle 1 may include the shape and/or the size of the vehicle, such as the vehicle 1 being a car, a bus, a delivery car or a truck. For example, a bus 1 has usually doors 2 only on one side, normally the side pointing towards the pedestrian line. When a bus 1 stops at a bus stop and the bus driver operates the door opening system, causing the bus doors 2 to open, usually there are always persons, normally the passengers wishing to board the bus 1, standing directly in front of the opening doors 2. This situation is different compared to a car 1, where normally there should not any person stand in front of door 2 when a person inside the cabin intend to open that door 2. These passengers should not influence the determination of the vehicle exit score. Therefore, for a bus 1, the determination 12 of the vehicle exits score may be carried out in a different way than for a passenger car 1.

The characteristics of the object in the vicinity of the vehicle 1 may also influence the determination 12 of the vehicle exit score. More specifically, the vehicle exit score may be determined considering particular recognized details of the object such as the geographically distance between the vehicle and the object, the velocity of the object, the movement direction (if any) of the object, the size and/or shape of the object, an identified type of the object such as the object being a human, a vehicle, a static object (e.g. a garbage bin standing on the footway). For example, the object may be a pedestrian moving at a typical walking speed, a bicycle or a motorbike or another car. The walking pedestrian walking at around 5 km/h usually has sufficient time to react on a door opening act and will avoid the opening door in time. Even a collision with that opening door 2 usually happens at low speed, so it will be unlikely that the pedestrian will suffer serious injuries. Riders of bicycles or motorbikes are, on the contrast much more vulnerable to a dooring accident, since they proceed at a much larger speed and their bodies are usually directly involved in a collision. The risk of severe injuries is therefore much higher for riders of bicycles and motor bikes. The determination 12 of the vehicle exit score may therefore different for a pedestrian and a rider of a bicycle or motorbike, e.g. lower if the object is determined to be pedestrian and higher if the object is determined to be a bicycle. The vehicle exit score may be determined to be lower if the object is farther away and to be higher if the object is closer to the vehicle. The vehicle exit score may be determined to be lower if the object is determined to be moving away from the vehicle and higher if the object is determined to be moving towards the vehicle, etc. Generally, the higher the determined object characteristics and/or vehicle characteristics indicate the risk of vehicle and/person damages potentially caused by the vehicle exit, the higher the vehicle exit score may be set.

The determination 12 of the vehicle exit score may include aggregated weights of the components included in the determination 12, such as the positions and/or movements of the persons inside the cabin of the vehicle 1, the detections of objects in the vicinity of the vehicle 1, the characteristics of the vehicle 1 and/or the objects. The components may be include sensor input form the vehicle sensing system such a inputs from cameras, radars etc.

The vehicle exit score may be compared to one or multiple thresholds in order to determine if and when a control signal is outputted. In some embodiments the vehicle exit score may include several thresholds defining e. g. the intensity of a warning signal the control signal causes to output. As an example, there may be a lower threshold for the vehicle exit score, at which a low impact warning signal is outputted, such in a case when a walking pedestrian is detected in the vicinity of the vehicle. A middle and a high threshold may be additionally defined for the outputting of higher impact warning signals such as for the detection of bicycle or motorbike riders or another vehicles. Hence, a lower vehicle exit score may exceed the low impact control signal threshold, causing outputting a low impact warning signal, causing, in turn, a visual and/or audio warning signal to the person. On the other hand, a higher vehicle exit score may not only exceed the low impact control signal threshold, but also the higher impact control signal threshold, causing the output of a more critical control signal which causes, in turn, temporarily locking the door until, e.g. an updated vehicle exit score is determined in a subsequent iteration of the present procedure indicating that the damage risk of the vehicle exit has decreased (e.g. because the bicycle which has previously approached the vehicle has then passed the vehicle moves away from the vehicle).

In some embodiments, the outputted control signal may be a raw control signal indicating the vehicle exit score, and further processing such as comparing the raw control signal against the one or more thresholds and determining a current criticality level of the vehicle exit may be performed by a further module such as a vehicle control system. In some embodiments, the outputted control signal is a comprehensive signal also indicating a determined criticality level of the vehicle exit. Combinations of both, i.e. the control signal indicating the vehicle exit score and a determined criticality level of the vehicle exit are envisaged as well.

The determination 12 of vehicle exit score may be carried out using deterministic mathematical models taking into account the various components to be included in the determination 12. The model may be defined by the various sensor of the vehicle sensing system, such as the cameras and/or the radars inside the vehicle cabin and the cameras and/or radars sensing the vicinity of the vehicle 1. In some embodiments, the determination 12 of the vehicle exit score may be carried out using machine learning methods outputting the vehicle exit score, such as neural networks and/or supervised learning and/or unsupervised learning and/or reinforcement learning and/or decision trees.

In some embodiments, the vehicle assistance system, in response to the control signal to the vehicle assistance system, locks the door of the vehicle and/or outputs a warning signal.

Figure 9:
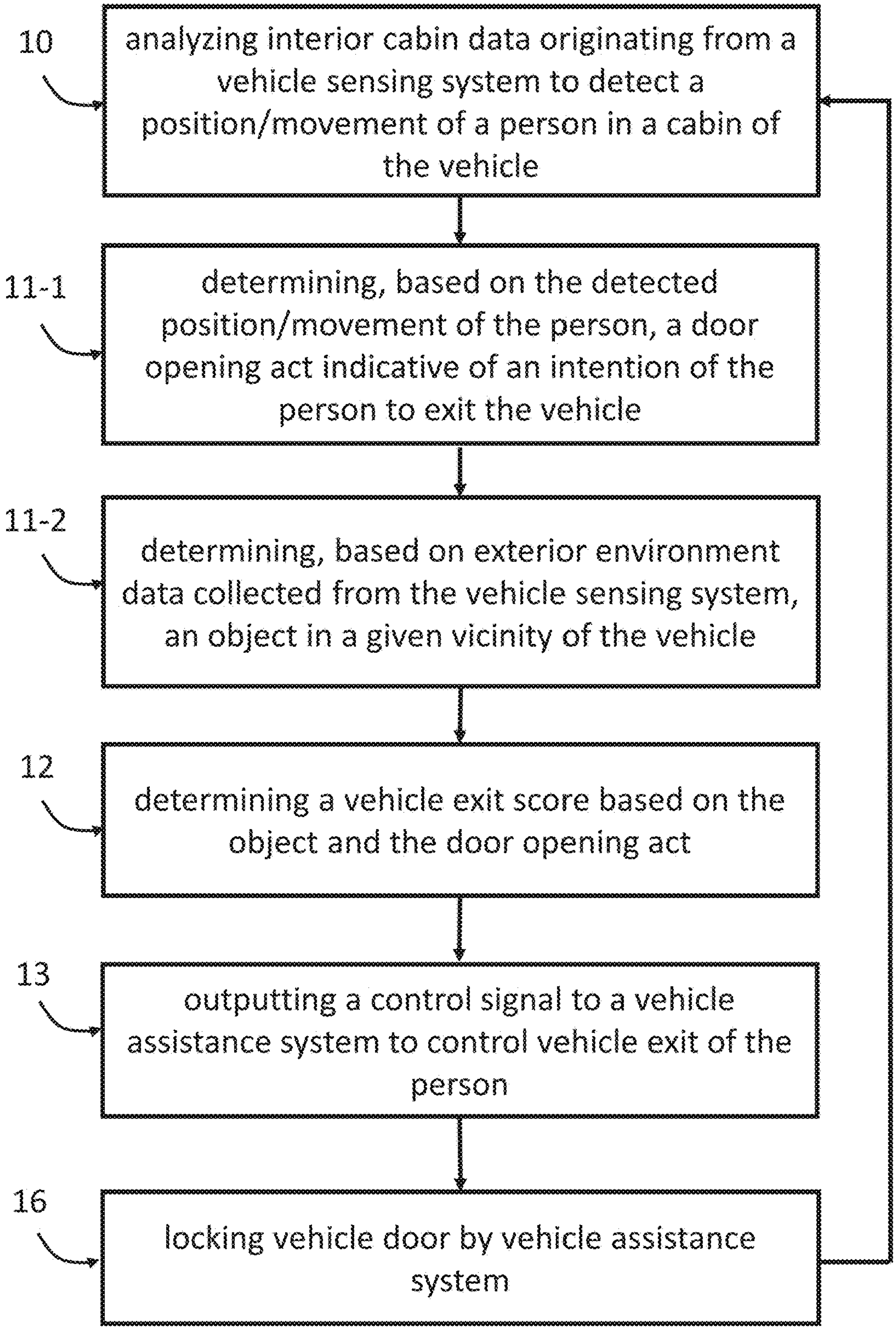
FIG. 9 shows a fourth example of a computer-implemented sequence for vehicle exit assistance as disclosed herein.

The vehicle assistance system, in response to the control signal to the vehicle assistance system, may perform a vehicle safety function. The vehicle security function includes one or more actions which facilitate the safety of the vehicle and persons in the vehicle. For example, the vehicle security function includes locking a door of the vehicle. In some embodiments, the vehicle assistance system locks the door 2 which has been detected to be about to be opened by the person. FIG. 9 shows the corresponding sequence. Activities 10 to 13 correspond to those of FIG. 2. In activity 16, the vehicle assistance system, in response to outputting the control signal, locks the door 2 of vehicle 1. In further embodiments, the vehicle assistance system may lock all doors of the vehicle 1, through which a person is able to embark or disembark the vehicle. This further strengthens the effectivity of the vehicle exit system, as e. g. in the case an object is detected in the vicinity of the vehicle 1, such e. g. a bicycle ridden by a person, a dooring accident can be prevented.

In some embodiments, the locking of the door can be manually overridden by a person in the vehicle 1. This enhances the safety for the persons inside the vehicle 1. In the case of a danger threatening the persons inside the vehicle 1, e. g. smoke or fire in the cabin, the persons are able to exit the vehicle 1 anyway, regardless whether the vehicle assistance system has previously locked the doors. Alternatively, the door locking may only be temporarily, e.g., 5 seconds, so that an emergency exit is possible after a short time period.

Figure 10:
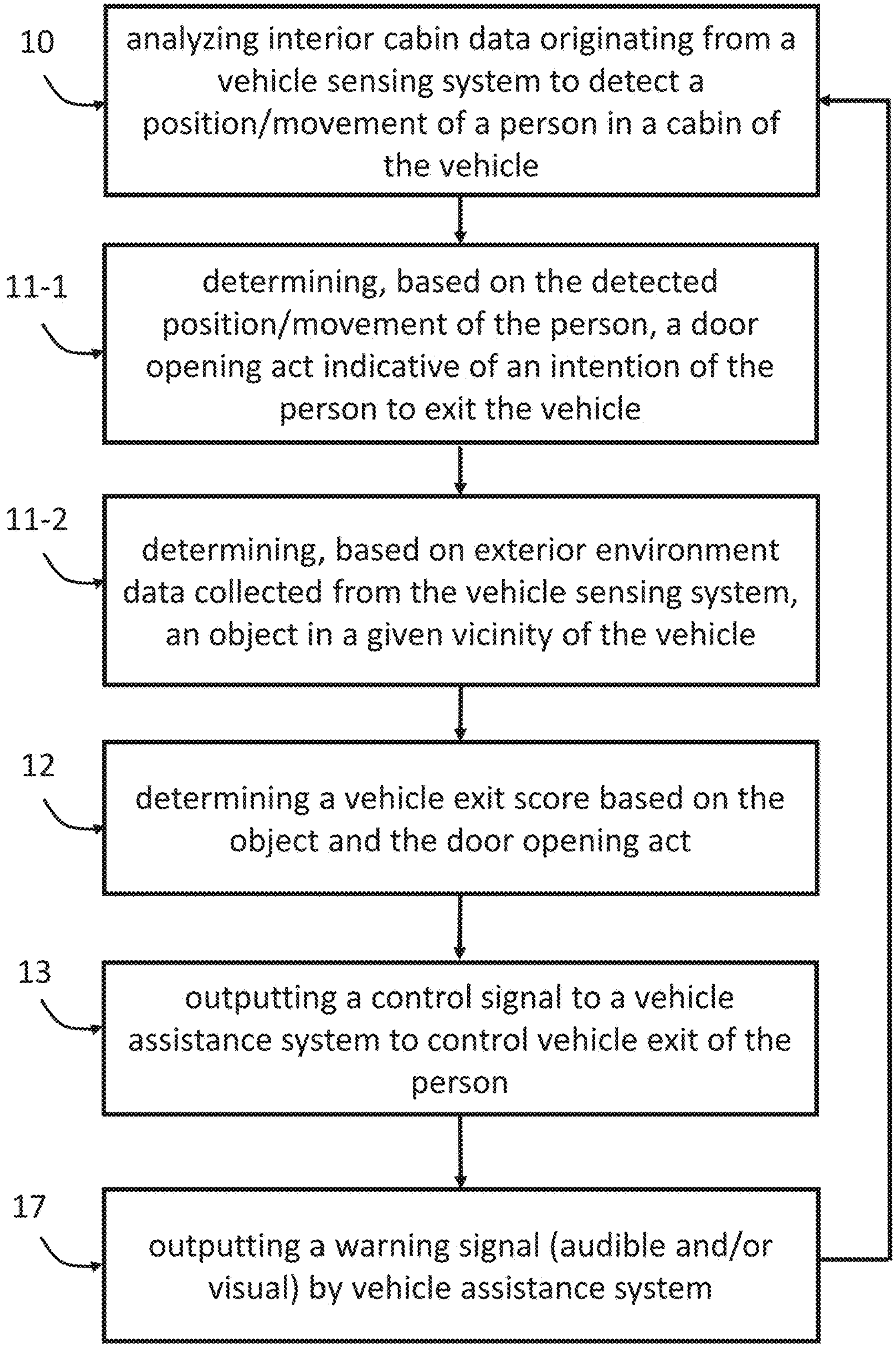
FIG. 10 shows a fifth example of a computer-implemented sequence for vehicle exit assistance as disclosed herein.

In addition or alternative to the door locking of FIG. 9, in response to the control signal to the vehicle assistance system, the vehicle safety function executed by the vehicle assistance system includes outputting a warning signal to a person or people in the vehicle. FIG. 10 shows the corresponding sequence. Activities 10 to 13 correspond to those of FIG. 2. In activity 17, the vehicle assistance system, in response to receiving the control signal, outputs the warning signal.

In some embodiments, the warning signal includes an audible warning and/or a visual warning and/or displaying a map of the vicinity of the vehicle and the object in the vicinity of the vehicle.

The outputting of the audible warning and/or a visual warning signal is shown in activity 17 of FIG. 10. The audible warning includes any tone that may be detected by a human ear, such as a buzzing tone, a whistle tone or a siren tone. In some embodiments, the audible warning includes a human voice, speaking out a warning such as: "Object approaching. Do not exit!". In some further embodiments, the visual warning includes any visual signal that may be detected by a human eye. In some embodiments, the visual signal includes a light signal, e.g., emitted, as shown in FIG. 1, by visual indicator 9 included by a side mirror 5 of the vehicle 1. The visual indicator 9 may include LEDs or light bulbs or any other mean for emitting visual light. In some embodiments, the visual indicator 9 may be located inside the cabin, such as on the dashboard of the vehicle 1 or at any other position inside or outside of the cabin of the vehicle. In some embodiments, the indicators 9 for outputting a visual warning may be located at several positions inside and/or outside the vehicle 1. In some embodiments, the indicators 9 for outputting the visual signal are combined with the indicators for outputting the audible warning signal. In some embodiments, the visual warning may include red light and or yellow light or any other light in the visible part of the spectrum. In some embodiments, a visual warning signal may be displayed on a vehicle head-up display. This enhances the probability that the person intending to open the door of the vehicle realizes that an object is in the given vicinity of the vehicle and the vehicle door is not be opened, thereby enhancing the warning effect of the vehicle assistance system.

Figure 11:
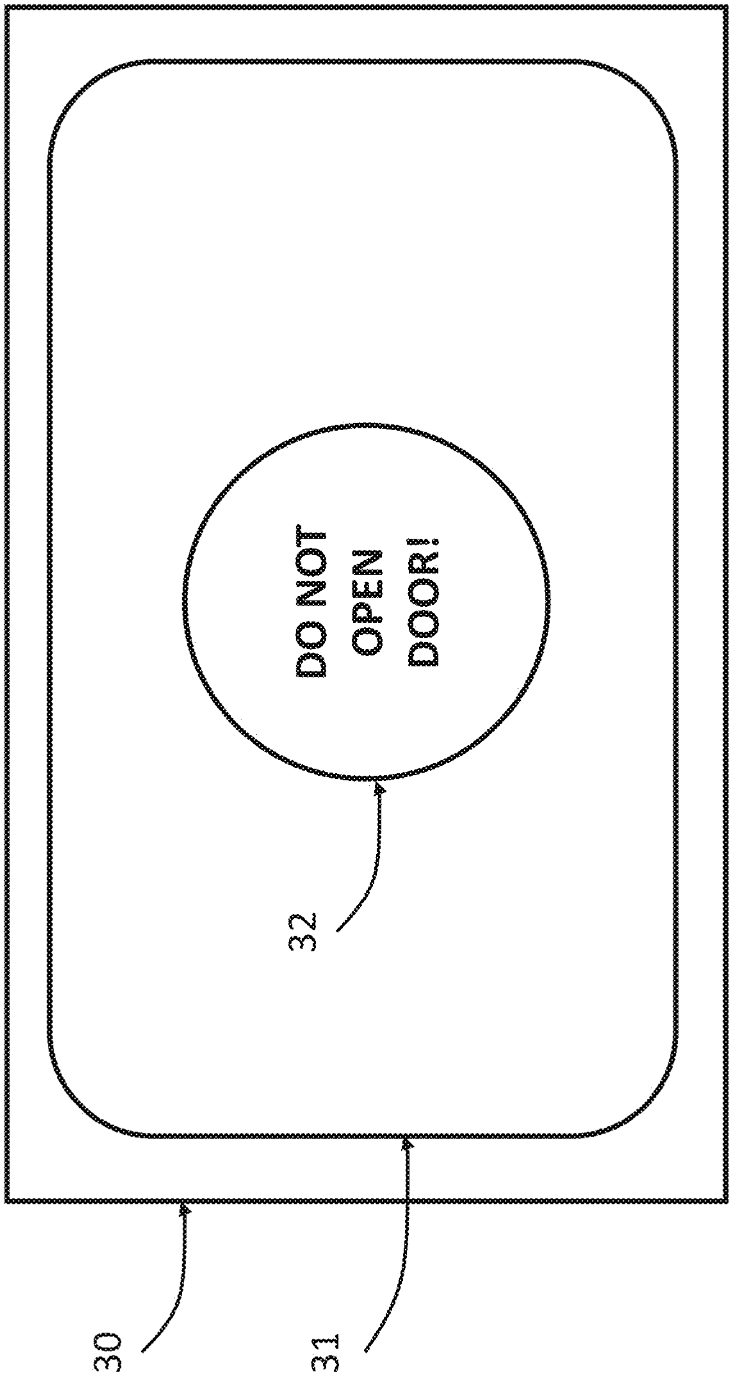
FIG. 11 shows a vehicle infotainment system with a warning information displayed.

In some embodiments, the warning signal includes displaying a warning information on a vehicle infotainment system. As an example, FIG. 11 shows a vehicle infotainment system 30, including a screen 31 with a warning information 32 displayed. The vehicle infotainment system 30 includes any infotainment system known in the prior art, especially infotainment systems 30 for displaying status report of the vehicle and providing entertainment to the persons in the vehicle. The vehicle infotainment systems 30 may include a screen 31 for providing information to the persons. In some embodiments, the infotainment system 30 includes a touch screen 31 for entering commands. The infotainment systems 30 may include screens 31 and/or touch screens 31 for displaying information and/or entering at several locations inside the cabin of the vehicle 1.

In some embodiments the warning information 32 displayed on the vehicle infotainment system 30 include a symbol usually associated with imminent danger, such as a red flashlight or a corresponding traffic sign, such as an exclamation mark within a red triangle. The warning information 32 may also include written information e. g. the expression: "DANGER!" and/or "DO NOT OPEN DOOR!". In some embodiments symbol based and written warning information 32 are combined. This provides an additional possibility to enhance the probability that the person intending to open the door of the vehicle realizes that an object is in the given vicinity of the vehicle and the vehicle door is not be opened, thereby strengthening the warning effectivity of the vehicle assistance system.

The warning information 32 may be outputted on the infotainment system in combination with an audible warning signal and/or other visible warning signals.

Figure 12:
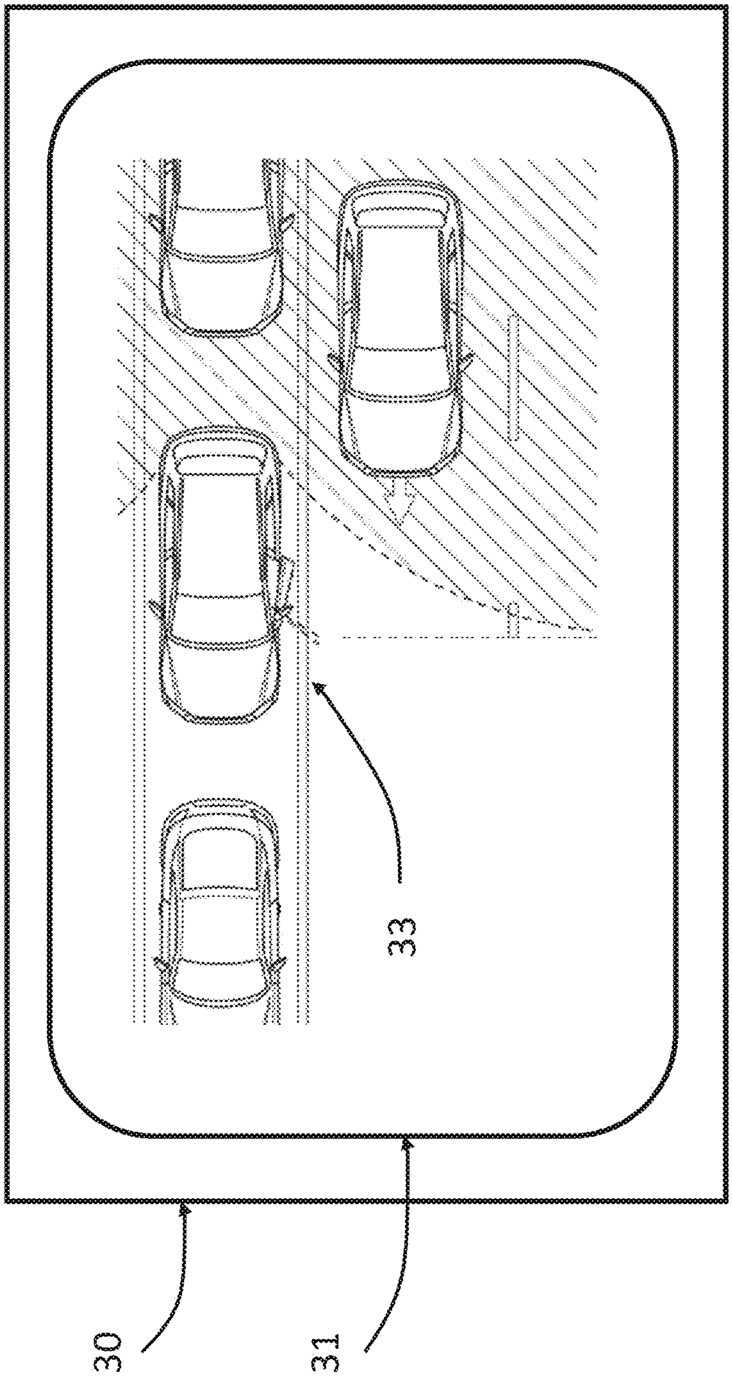
FIG. 12 shows a vehicle infotainment system with a map displayed.

The outputting of the warning signal may cause displaying a map of the vicinity of the vehicle and the object in the vicinity of the vehicle. FIG. 12 shows a map 33 be displayed on the screen 31 of the vehicle infotainment system 30. This enables the person in the vehicle 1 a better judgement of the traffic situation surrounding the vehicle and the current hazard originating from the traffic situation.

In some further embodiments, the map is displayed on a vehicle head-up display.

Figure 13:
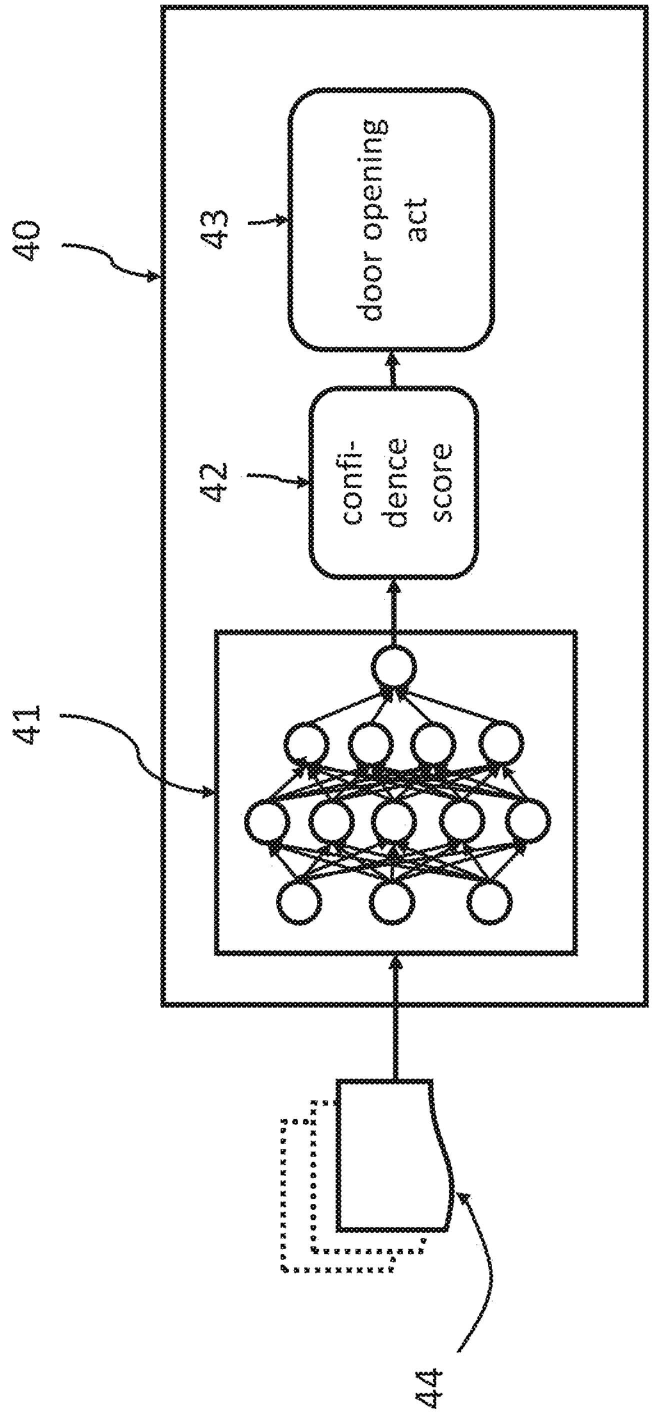
FIG. 13 shows an implementation example of a system for determining whether a door opening act is about to occur.

In some embodiments, the determining of the door opening act and/or the object in the vicinity of the vehicle utilizes machine learning based methods. In some further embodiments, the machine learning based methods include neural networks and/or supervised learning and/or unsupervised learning and/or reinforcement learning and/or decision trees. FIG. 13 presents an implementation example of a system for determination whether a door opening act is about to occur. In this example, the system includes a door opening classifier 41 being a neural network with a first input channel configured to receive one (or more) current image(s) 44 from e. g. a camera system of the vehicle interior sensing system 6. In this example, the door opening classifier 41 is trained to output a confidence score 42, e.g., a number between 0 and 100 relating to the confidence that a door opening act is about to occur shown in the current image 44. The door opening classifier 41 may then also output the classification, i.e., whether there is a door opening act or no door opening act, based on and along with the confidence score for this classification. This reduces the likelihood of an incorrect determination of a door opening act based on the detected position and/or movement of the person in the cabin as well as the exterior environment data, since e. g. corresponding data of earlier correct responses of the system also form the basis of the determination, thereby strengthening the reliability of the system.

Figure 14:
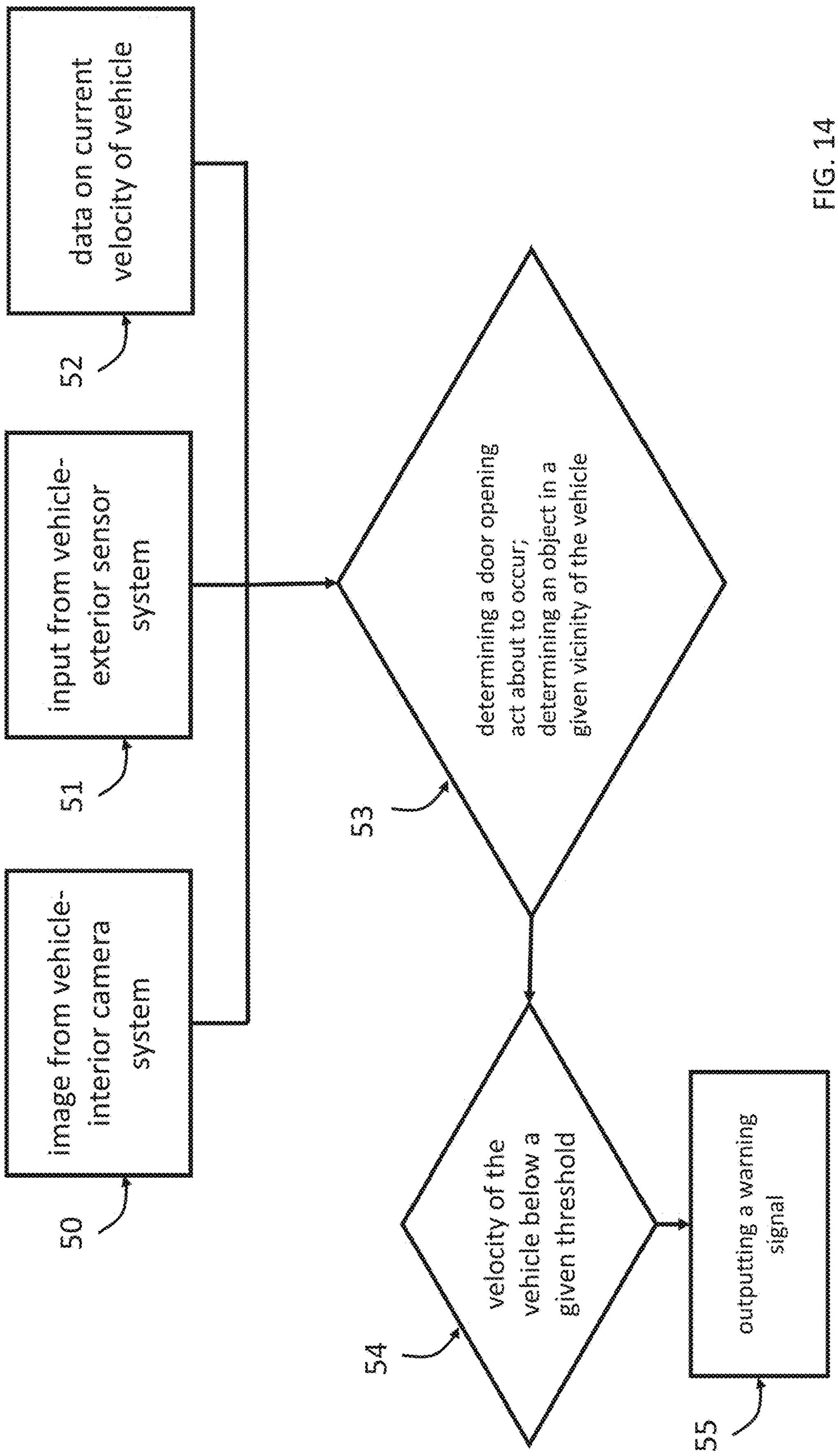
FIG. 14 shows a sixth example of a computer-implemented sequence for vehicle exit assistance as disclosed herein.

FIG. 14 schematically shows a computer-implemented method of providing safety for disembarking from a vehicle as provided by this disclosure. The method includes receiving, in an activity 50, from a vehicle-interior camera system monitoring a person cabin of the vehicle 1, at least one image of a portion of an interior of the vehicle 1 showing at least a part of the person in the vehicle 1. The method further includes receiving, in an activity 51, by a vehicle-exterior sensing system monitoring external surroundings of the vehicle 1, at least one sensor output relating to at least a part of external surroundings of a door 2 of the vehicle 1 and receiving, in an activity 52, data on a current velocity of the vehicle 1. The method further includes determining, in an activity 53, based on the at least one image received by a vehicle-interior camera system 6, a door opening act as well as determining, in the activity 53, based on the at least one sensor output of the vehicle-exterior sensing system, whether an object is in a given vicinity of the vehicle 1. In response to determining that a door opening act about to occur is above a probability threshold and an object is in a given vicinity of the vehicle 1, the method further includes, outputting, in activity 55, a warning signal, in response to determining, in activity 54, that the data on the current velocity of the vehicle indicates that the velocity of the vehicle is below (or corresponds to) a given velocity threshold, e. g. the walking speed of a pedestrian of around 5 km/h or complete standstill at 0 km/h.

Figure 15:
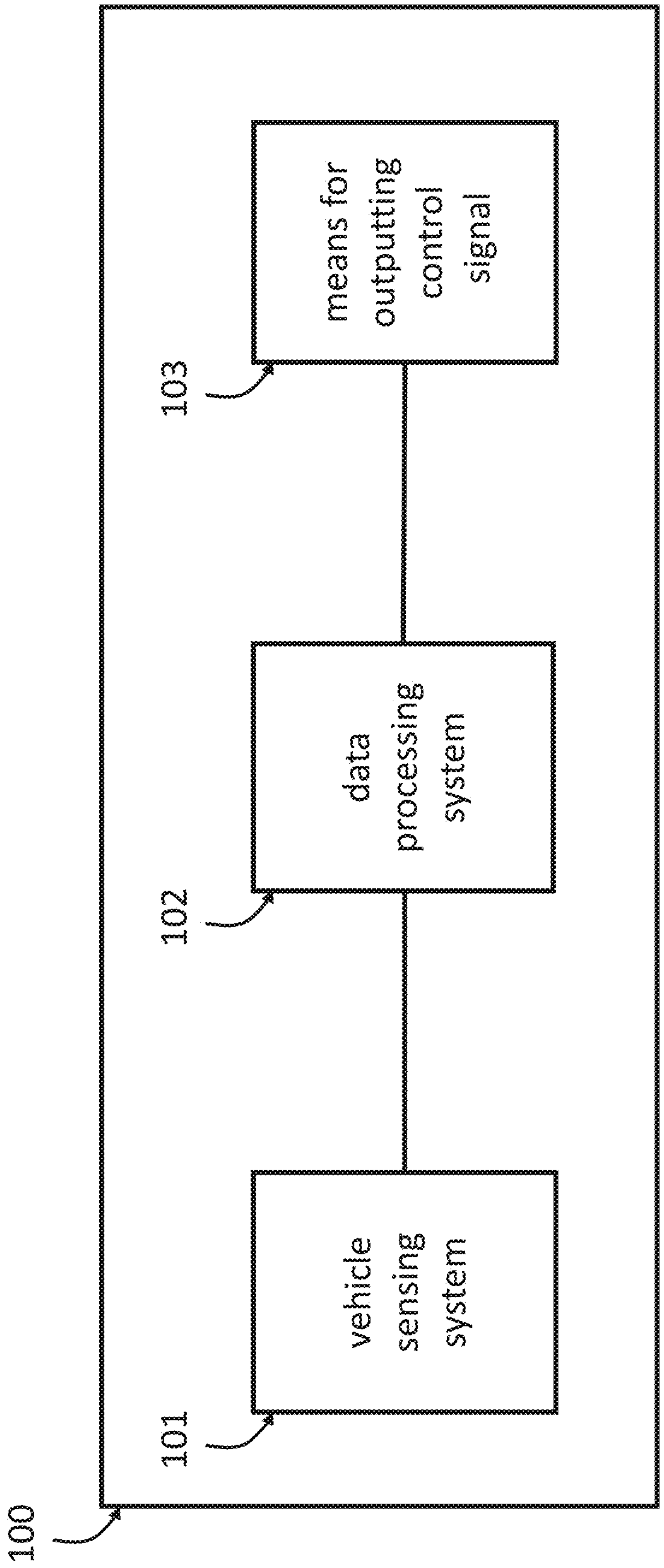
FIG. 15 schematically shows a system for vehicle exit assistance.
Figure 16:
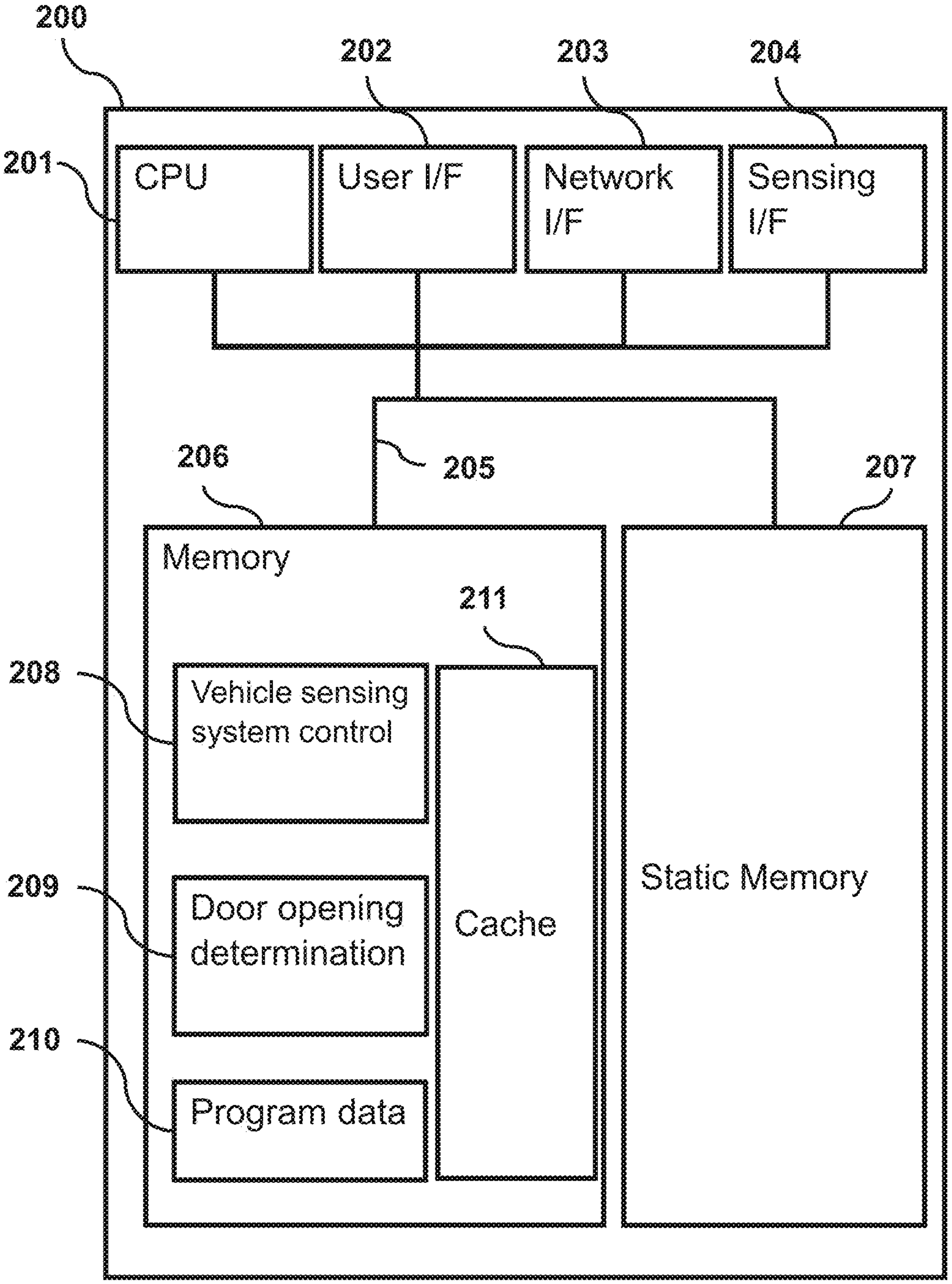
FIG. 16 is a diagrammatic representation of internal components of a data processing system includes by the system for vehicle exit assistance.

According an aspect, a system 100 for vehicle exit assistance is provided, including, as shown in FIG. 15, a vehicle sensing system 101, a data processing system 102 and interfaces for outputting a control signal 103, the system being configured to perform any one of the computer-implemented methods as described in the preceding paragraphs. FIG. 16 is a diagrammatic representation of internal components of a data processing system 200 implementing the functionality as described herein. The data processing system 200 may be located in the vehicle 1 and includes at least one processor 201, a user interface 202, a network interface 203 and a main memory 206, that communicate with each other via a bus 205. Optionally, the data processing system 200 may further include a static memory 207 and a disk-drive unit (not shown) that also communicate with each via the bus 205. A video display, an alpha-numeric input device and a cursor control device may be provided as examples of user interface 202.

Furthermore, the data processing system 200 may also include a specified sensing interface 204 to communicate with vehicle sensing system 101 of the vehicle 1. Alternatively, the data processing system 200 may communicate with the vehicle sensing system 101 via the network interface 203. The vehicle sensing system 101 is used for generating interior cabin data to detect a position and/or movement of a person in a cabin of the vehicle 1 and exterior environment data to detect an object in a given vicinity of the vehicle 1. The data processing system 200 may also be connected to database systems (not shown) via the network interface, wherein the database systems store at least part of the images needed for providing the functionalities described herein.

The main memory 206 may be a random-access memory (RAM) and/or any further volatile memory. The main memory 206 may store program code for the vehicle sensing system control 208 and the determination of a door opening 209. The memory 206 may also store additional program data required for providing the functionalities described herein. Part of the program data 210, the determination of a door opening 209 and/or the vehicle sensing system control 208 may also be stored in a separate, e.g., cloud memory and executed at least in part remotely. In such an embodiment, the memory 206 may store the current occupancy and seat states according to the methods describes herein in a cache 211.

Figure 17:
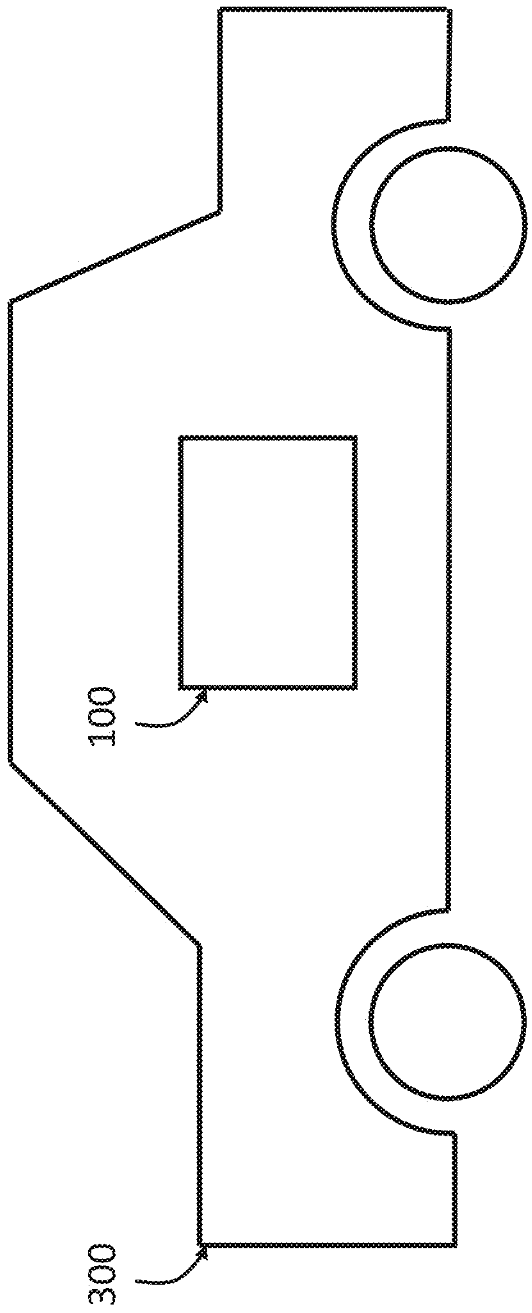
FIG. 17 schematically shows a vehicle including a system for vehicle exit assistance.

According to an aspect, as shown in FIG. 17, a vehicle 300 is provided including the system 100 as described in the preceding paragraphs executing any one of the methods as described within the present disclosure. Within the present disclosure, the term “vehicle” includes all type of vehicles, where a person can manually open a door, such as a car, an autonomous car, a streetcar, a railway-car etc.

According to an aspect, a computer program including instructions is provided. These instructions, when the program is executed by a computer, cause the computer to carry out the methods described herein. The program code embodied in any of the systems described herein is capable of being individually or collectively distributed as a program product in a variety of different forms. In particular, the program code may be distributed using a computer readable storage medium having computer readable program instructions thereon for causing a processor to carry out aspects of the embodiments described herein.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

It should be appreciated that while particular embodiments and variations have been described herein, further modifications and alternatives will be apparent to persons skilled in the relevant arts. In particular, the examples are offered by way of illustrating the principles, and to provide a number of specific methods and arrangements for putting those principles into effect.

In certain embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the disclosure. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "include", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, the described embodiments should be understood as being provided by way of example, for the purpose of teaching the general features and principles, but should not be understood as limiting the scope, which is as defined in the appended claims.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computer-implemented method for vehicle exit assistance, the computer-implemented method comprising:
 - analyzing interior cabin data originating from a vehicle sensing system to detect a position and/or movement of a person in a cabin of a vehicle;
 - determining, based on the detected position and/or movement of the person, a door opening act indicative of an intention of the person to exit the vehicle;
 - determining, based on exterior environment data collected from the vehicle sensing system, an object in a vicinity of the vehicle;
 - determining a vehicle exit score based on the object and the door opening act;
 - comparing the vehicle exit score to at least two thresholds in order to determine if and when a control signal is outputted;
 - based on the comparison of the vehicle exit score to the at least two thresholds, outputting, based on the vehicle exit score, the control signal to a vehicle assistance system of the vehicle to control vehicle exit of the person; and
 - in response to the control signal, automatically restricting, via the vehicle assistance system, operation of a door of the vehicle.

2. The computer-implemented method of claim 1 wherein the control signal is outputted in response to:
 - determining that the door opening act is about to occur, and
 - the object in the vicinity of the vehicle is detected.

3. The computer-implemented method of claim 1 further comprising outputting the control signal in response to data on a current velocity of the vehicle indicating that the current velocity is below a threshold.

4. The computer-implemented method of claim 1 wherein determining the door opening act includes determining a number of body keypoints indicative of a location of defined body portions of the person.

5. The computer-implemented method of claim 1 wherein determining the door opening act includes determining whether the person has unfastened a seatbelt.

6. The computer-implemented method of claim 1 wherein determining the door opening act includes determining, based on the interior cabin data, whether a body part of the person is oriented towards a door of the vehicle.

7. The computer-implemented method of claim 6 wherein the body part includes at least one of eyes and head.

8. The computer-implemented method of claim 1 wherein determining the door opening act includes tracking of one or more shoulder keypoints and/or hand keypoints and/or elbow keypoints.

9. The computer-implemented method of claim 1 wherein determining the vehicle exit score is based on at least one of characteristics of the vehicle and characteristics of the object.

10. The computer-implemented method of claim 1 wherein determining of the door opening act includes:

detecting areas surrounding a hand of the person and a handle of a door of the vehicle; and calculating at least one of distance and overlap between the hand and the handle.

11. The computer-implemented method of claim 1 further comprising, in response to outputting of the control signal, at least one of locking a door of the vehicle and outputting a warning signal.

12. The computer-implemented method of claim 1 further comprising:

in response to outputting of the control signal, outputting a warning signal, wherein the warning signal includes at least one of an audible warning, a visual warning, and display of a map of the vicinity of the vehicle including the object.

13. The computer-implemented method of claim 1 wherein determining the door opening act uses machine-learning-based methods.

14. The computer-implemented method of claim 1 wherein determining presence of the object uses machine-learning-based methods.

15. A system for vehicle exit assistance, the system comprising:

a vehicle assistance system;

a vehicle sensing system configured to detect positional data of a person in a cabin of a vehicle, wherein the positional data includes at least one of position and movement of the person; and a data processing system configured to:

determine, based on the positional data, a door opening act indicative of an intention of the person to exit the vehicle, determine, based on exterior environment data collected from the vehicle sensing system, an object in a vicinity of the vehicle, determine a vehicle exit score based on the object and the door opening act, compare the vehicle exit score to at least two thresholds in order to determine if and when a control signal is outputted, based on the comparison of the vehicle exit score to the at least two thresholds, output the control signal to the vehicle assistance system to control vehicle exit of the person, and in response to outputting the control signal, automatically restrict, via the vehicle assistance system, operation of a door of the vehicle.

16. The system of claim 15 further comprising an interface configured to generate a warning signal to the person in response to outputting of the control signal.

17. A vehicle comprising the system of claim 15.

18. A non-transitory computer-readable medium comprising instructions including:

analyzing interior cabin data originating from a vehicle sensing system to detect a position and/or movement of a person in a cabin of a vehicle;

determining, based on the detected position and/or movement of the person, a door opening act indicative of an intention of the person to exit the vehicle;

determining, based on exterior environment data collected from the vehicle sensing system, an object in a vicinity of the vehicle;

determining a vehicle exit score based on the object and the door opening act;

comparing the vehicle exit score to at least two thresholds in order to determine if and when a control signal is outputted;

based on the comparison of the vehicle exit score to the at least two thresholds, outputting the control signal to a vehicle assistance system of the vehicle to control vehicle exit of the person; and in response to outputting the control signal, automatically restricting, via the vehicle assistance system, operation of a door of the vehicle.

* * * * *